United States Patent [19]

Souza et al.

[11] 4,175,514
[45] Nov. 27, 1979

[54] AUTOMATIC MILKING MACHINE CONTROL AND CLEANSING

[75] Inventors: Frank F. Souza, Hilmar; Vernon A. Silva; Tony Cabral, both of Turlock, all of Calif.

[73] Assignee: Frank F. Souza, Inc., Turlock, Calif.

[21] Appl. No.: 798,292

[22] Filed: May 19, 1977

[51] Int. Cl.² ............................................. A01J 7/00
[52] U.S. Cl. ................................. 119/14.08; 119/14.18
[58] Field of Search ............... 119/14.18, 14.08, 14.02; 138/45 A, 46

[56] References Cited

U.S. PATENT DOCUMENTS

| | | | |
|---|---|---|---|
| 2,361,096 | 10/1944 | Hartwig | 138/46 |
| 3,237,914 | 3/1966 | Alix | 138/46 X |
| 3,433,245 | 3/1969 | Cymbalisty | 138/46 X |
| 3,789,798 | 2/1974 | Reisgies et al. | 119/14.08 |
| 4,034,713 | 7/1977 | Umbaugh | 119/14.18 |

FOREIGN PATENT DOCUMENTS 1017567  1/1966  United Kingdom ................. 119/14.18

Primary Examiner—Hugh R. Chamblee
Attorney, Agent, or Firm—C. Michael Zimmerman

[57] ABSTRACT

An automatic milking machine is described which includes a pneumatic circuit for controlling the same and apparatus for automatically cleansing the interior of a cow milking teat cup cluster between the milking of successive cows therewith. The cleansing apparatus includes an arrangement for automatically disconnecting the teat cup cluster from the milk circuit between cows, and then successively passing therethrough various liquids which cleanse the same.

7 Claims, 7 Drawing Figures

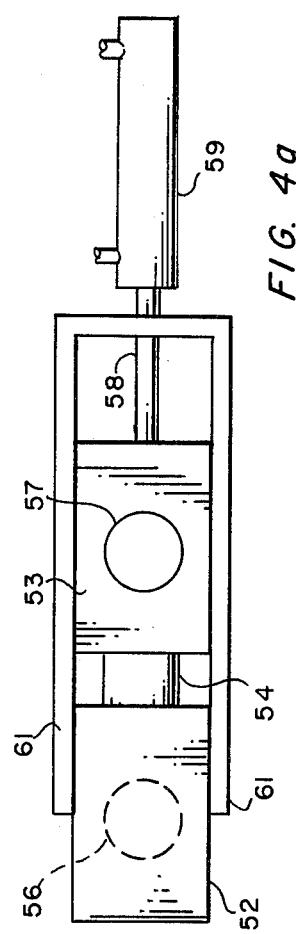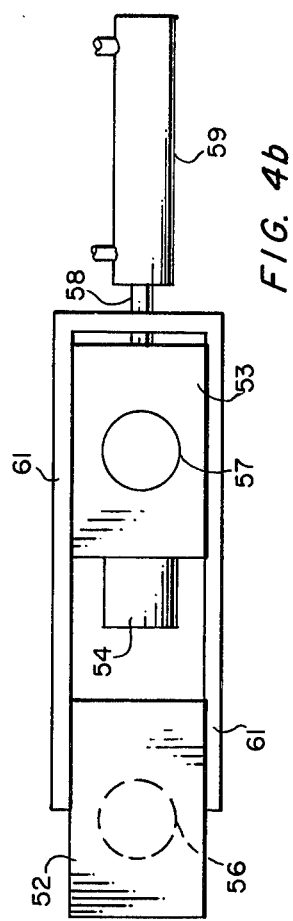

AUTOMATIC MILKING MACHINE CONTROL AND CLEANSING

BACKGROUND OF THE INVENTION

The present invention relates to automatic milking machines and, more particularly, to apparatus for automatically cleansing the interior of a cow milking teat cup cluster between the milking of successive cows therewith.

In automatic milking, a cluster of teat cups are applied to a cow's udder, a pulsating pneumatic or vacuum source is applied to the teat cups to effect milking, and the resulting milk is drawn by a vacuum from the cluster to a milk collection tank. Typically, a plurality of such clusters are connected to the milk receptacle to enable a plurality of cows to be milked simultaneously. However, there are generally many more cows than there are clusters with the result that each individual cluster is used to milk a plurality of successive cows.

Use of a single teat cup cluster successively for different cows during a milking operation can result in the spread of disease through a dairy herd. More particularly, any bacteria or other infectious material on the teats of one cow can be transmitted by the cluster teat cups to any cow with which such cluster is later used. While this problem has been recognized for some time, no effective solution to the same has been forthcoming. That is, although those in the art recognize the desirability of cleansing a teat cup cluster between uses with successive cows, no practical apparatus or method for effecting such cleansing has been devised. In this connection, it is all-important that the cleansing method and apparatus be one which assures that neither the cleansing fluid nor any other contaminant can be mixed with the milk. The use of a simple valving arrangement to isolate the milk receptacle from a teat cup cluster during the cleaning operation is not practical, since residual cleansing fluid on the internal surfaces of the valves typically will mix with milk emanating from the next cow to be milked. Moreover, there is concern that valve failure or the like may result in undetected contamination of milk already in the collection tank.

SUMMARY OF THE INVENTION

The present invention includes a method and apparatus for internally cleansing a teat cup cluster between the milking of successive cows, in a manner providing positive assurance that the milk cannot be contaminated by the cleansing fluid. In its basic aspects, the method includes interrupting fluid communication of a teat cup cluster with the milk collection tank or other receptacle, prior to cleansing fluid being passed through such cluster. Most desirably, such interruption is a physical separation of a pair of adjacent flow components in the line between the cluster and the milk collection tank, which flow components normally provide a continuous flow path for milk. Such physical separation of the milk collection tank from the cup cluster during the cleansing operation assures that even if cleansing fluid leaks into the milk flow line, it cannot reach the collection tank.

The cleansing method and apparatus is designed to be incorporated into conventional milking equipment to provide cleansing as an automatic part of the cow milking cycle. In this connection, it is important in such an automatic arrangement that the sensor included for detecting when a cow has been completely milked be reliable. Difficulty has been experienced in the past in designing a reliable sensor because it is not unusual for milk flow from a cow to be disrupted because of the cow temporarily "holding back" her milk, rather than all of her milk having been given. The present invention includes as one salient feature thereof a reliable sensor for detecting ultimate discontinuance of milk flow designed to ignore temporary flow disruptions. Such means include a milk chamber having an inlet for receiving milk from the cluster and an outlet spaced upwardly from the bottom of such chamber a distance defining a volume of milk which will be filled during normal flow of milk; means to meter flow of milk from the volume at a predetermined rate; and means to sense when the milk in the volume reaches a predetermined depth indicating no appreciable milk has flowed into the inlet of the chamber from the teat cup cluster for a predetermined time. This construction provides in a quite simple manner, a reversible automatic time delay between interruption of milk flow and the triggering of the sensing device. The time delay preferably is selected to be longer than the longest typical time milk flow is temporarily disrupted, to avoid premature triggering.

Most desirably, the sensing means includes a float within the chamber floated by any milk therewithin, and means to sense the presence of the float at a position indicating no appreciable milk has flowed into the chamber for a predetermined time. The sensor is adapted to direct the control circuit for the milking operation to begin the cleansing cycle of a cup cluster only when it is reliably determined that the cow milking operation is completed.

The invention includes other features and advantages which will be described or will become apparent from the following more detailed description.

BRIEF DESCRIPTION OF THE DRAWING

With reference to the accompanying five sheets of drawing:

FIGS. 4a and 4b are somewhat schematic elevational views illustrating two different positions of a pair of components in the milk flow path which are separated in accordance with the invention to interrupt fluid communication of the milk cluster with the milk collection tank;

DETAILED DESCRIPTION OF THE PREFERRED EMBODIMENT

Figure 1:
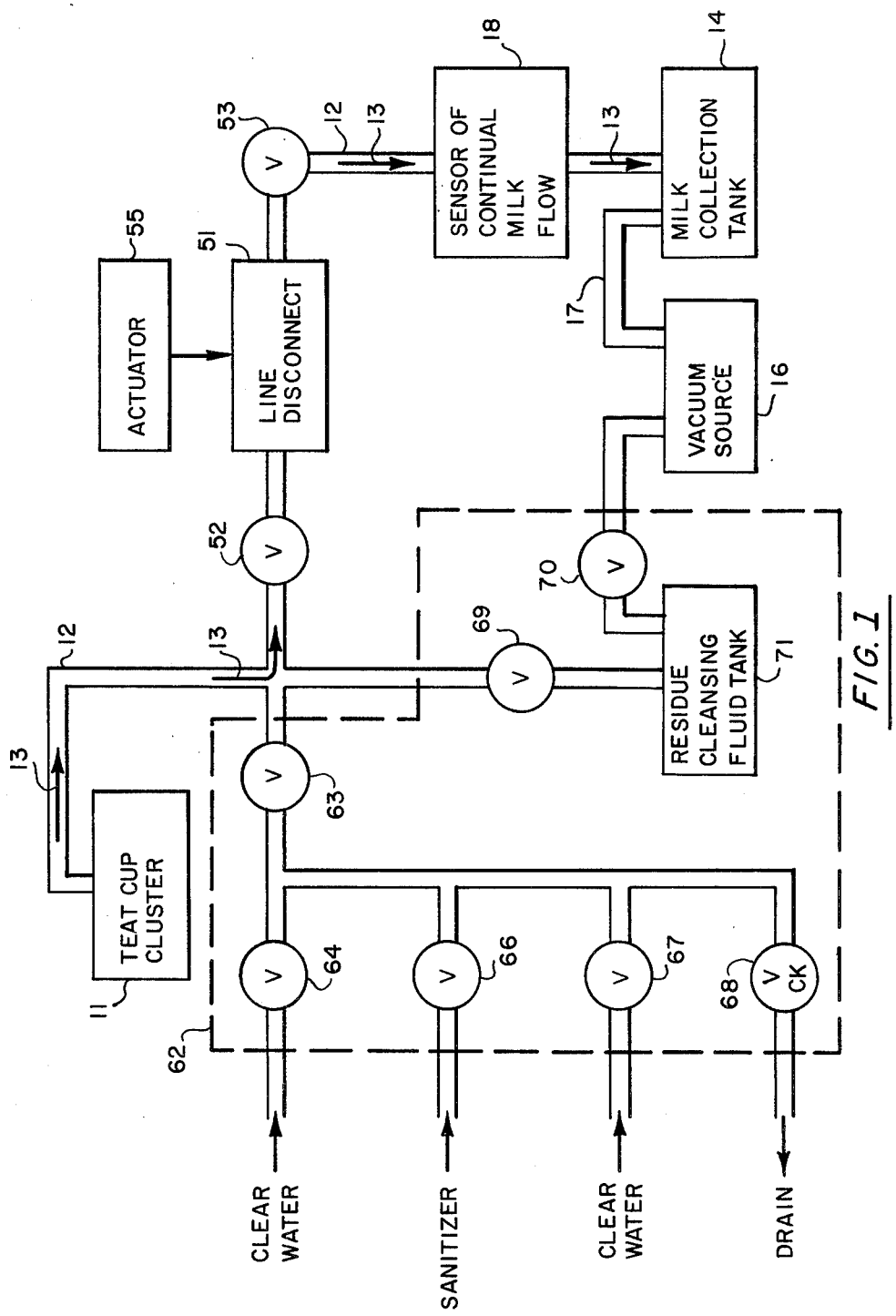
FIG. 1 is an over-all schematic diagram of a teat cup cleansing apparatus of the invention incorporated into that portion of an automatic milking machine with which it is associated.

FIG. 1 schematically illustrates the mechanical portion of a preferred embodiment of the invention and the manner in which it is incorporated into an automatic milking arrangement. With reference to such figure, a teat cup cluster for receiving milk from a cow is referred to by the reference numeral 11. It is contemplated that such cluster include, as is conventional, a milk claw having a plurality, e.g., four, teat cups connected thereto for attachment to the udder of a cow. Although not shown in the drawing, the milking machine has, as is also conventional, a pulsating vacuum or pneumatic source connected to the teat cups to cause the same to milk a cow's udder.

During the milking operation, milk is drawn by a vacuum through the line 12 on the path indicated by the arrows 13 into a milk collection tank 14. In this connection, a vacuum source 16 is shown connected to the tank 14 via vacuum line 17 to apply vacuum thereto and thus draw the milk into the tank. Valves and other structure to be described in detail hereinafter are included in the milk flow path. During the milking operation, such components normally permit communication of the cluster 11 with the tank 14.

One of the components in the milk flow path is a sensor 18 for detecting discontinuance for more than a predetermined time of the flow of milk. Such a discontinuance indicates that the particular cow being milked has given all of her milk.

Figure 2:
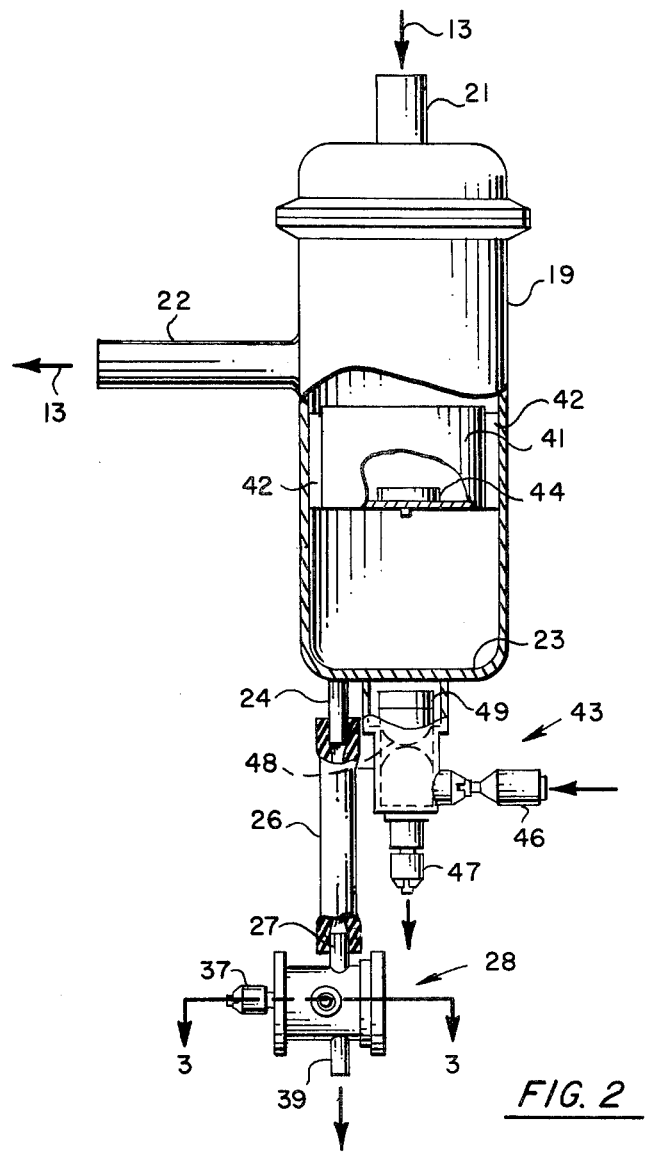
FIG. 2 is a broken-away side elevational view of apparatus of the invention for detecting discontinuance for more than a predetermined time of milk flow from a cow milk teat cup cluster.
Figure 3:
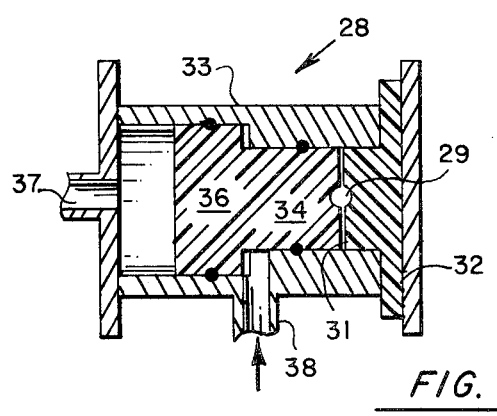
FIG. 3 is an enlarged sectional view of a portion of the apparatus illustrated in FIG. 2, taken on a plane indicated therein by the line 3—3.

As mentioned previously, it is important that any sensor included to detect ultimate discontinuance of milk flow be able to ignore intermittent interruptions or variations in such flow. Sensor 18 is capable of reliably making such distinction, while yet being simple and rugged. FIGS. 2 and 3 illustrate details of such sensor. It includes a vertically oriented milk chamber 19 having a milk inlet nipple 21 at its upper end for receiving milk from the milk cluster. A main milk outlet nipple 22 projects from the side wall of the chamber at a location spaced upwardly from the bottom wall 23 of such chamber.

It will be recognized that before milk entering chamber 19 through inlet 21 will exit the chamber through outlet 22, the volume of the chamber between its bottom 23 and the outlet nipple 22 must be filled with milk. The size of the volume is controlled partly by the distance nipple 22 is spaced upwardly from the chamber bottom wall 23, and is selected to assure that the volume will be filled with milk during normal flow of milk from a cow.

Means are provided to meter flow of milk from the chamber volume beneath outlet nipple 22. That is, a nipple 24 communicating with the bottom of such chamber is connected via a conduit 26 to the inlet 27 of a metering device 28. As is best illustrated in FIG. 3, metering device 28 includes a limiting orifice 29 which restricts the rate of milk flow from the chamber volume.

It should be noted that the art has in the past avoided the use of limiting orifices to restrict liquid flow in a milking machine. The problem is that milk or other liquid in a milking machine generally includes an appreciable amount of particulate matter which can obstruct flow through such a limiting orifice. The sensing device of the invention is designed to prevent such an obstruction from occurring. More particularly, means are included for periodically enlarging the limiting orifice to permit passage of any obstruction which otherwise would deleteriously obstruct the flow of liquid therethrough. With reference to FIG. 3, it will be seen that the limiting orifice is defined partly by an end wall 31 of a plug 32 which closes one end of the cylindrical chamber 33 making up the body of the metering device 28. The opposed periphery of the limiting orifice is defined by the end surface 34 of a pneumatic piston 36 contained within the metering device chamber. As illustrated, air inlets 37 and 38 are provided to introduce air pressure to opposite working head surfaces of the piston 36. By alternating the application of pressure through the inlets 37 and 38, the piston 36 can be reciprocated within the metering device. When such piston is in the extended position illustrated, the end surface 34 of the same essentially will mate with the surface 31 of the plug to define the limiting orifice 29. However, when the piston is withdrawn from the end surface 31, the orifice 29 will be effectively enlarged to permit passage therethrough of any particles which otherwise would obstruct the orifice.

The greater volume of milk flow through the metering device when the piston is withdrawn is one factor governing the design of the mechanical construction for the desired milk flow rate. Milk passing through metering device 28 exits through outlet 39 which can be connected to the milk collection tank by, for example, being connected to the fluid line extending between main outlet nipple 22 and the milk collection tank.

It should be noted that flow through metering device 28 is independent of flow through chamber outlet nipple 22. That is, flow of milk through the metering device requires only that milk be present within the volume of the chamber below main outlet nipple 22, irrespective of whether or not the milk level in the chamber drops below main outlet nipple 22. Thus, the timing function provided by metering device 28 will not be disrupted by intermittent interruptions in the flow of milk into chamber 19. Ultimate discontinuance of milk flow into the chamber, though, will allow the milk within the volume below the nipple 22 to be completely exhausted by flow through the metering device.

Means are provided to sense when the milk in the chamber volume beneath the nipple 22 is exhausted. To this end, a float 41 is positioned within the chamber to be floated by any milk therewithin. Such float is a closed, hollow cylinder having radially extending fins 42 to engage the inner cylindrical walls of the chamber 19 and guide the movement of such float.

Float 41 will follow the level of milk within chamber 19. That is, when the milk is flowing out of main outlet 22, the float will be held at the top of the volume beneath such outlet. However, when the milk level begins falling, the float 41 will be lowered thereby.

Means are provided to sense the presence of the float 41 at a position indicating that there is no appreciable milk flowing into the inlet of the chamber. More particularly, a conventional pneumatic proximity sensor 43, such as the sensor manufactured and sold by Automatic Switch Co., Florham Park, N.J., under catalog number 6,080,067, is located at the bottom of the chamber. Such sensor will permit air flow between its inlet and outlet nipples 46 and 47 until such time as the actuator 48 thereof is lifted upwardly from its seat.

A permanent magnet 44 is installed within the interior of the float 41 adjacent its bottom wall. When the float reaches the bottom of the container, such magnet will attract a similar permanent magnet 49 secured to the upper end of the sensor actuator 48. Upon such attraction, and consequent lifting of actuator 48 upwardly, the flow between ports 46 and 47 will be inhibited, with the result that an indication is made that there is no appreciable milk remaining in chamber 19.

It should be apparent from the above how the construction provides a desired delay between the time milk discontinues flowing from the main chamber outlet 22 and the time the sensor indicates that there is no milk flowing from the cow. It should be noted that the length of the time delay is adjustable by varying the amount of milk permitted to flow through the orifice 29 of the metering device 28 by, for example, simply changing the oscillatory frequency of the piston 36.

Upon sensor 43 indicating that the cow being milked is finished giving her milk, the milking cycle is terminated and the cluster cleansing cycle begins.

In keeping with the invention, means are included along milk flow path 13 to interrupt fluid communication of the cluster 11 with the tank 14 before cleansing fluid is passed through the cluster. To this end, a pair of adjacent flow components normally having a continuous flow path therebetween for milk flow are actually physically separated. This is represented in FIG. 1 by the "line disconnect" box 51 positioned between a pair of vacuum isolation or shutoff valves 52 and 53, respectively. An actuator 55 is also included diagrammatically in FIG. 1 for operating the line disconnect 51.

Although various physical arrangements can be utilized for physically disconnecting the flow components to provide the line interruption, FIGS. 4a and 4b illustrate a relatively simple and yet reliable disconnect arrangement. With reference to such figure, vacuum isolation valves 52 and 53 are illustrated in communication with one another via a fluid pipe nipple 54. Milk flow to the components is through inlet 56 of valve 52 whereas milk emanates from the combination of components at outlet 57 of valve 53.

FIG. 4a illustrates the combination of components when they provide a continuous flow path for milk, and FIG. 4b illustrates the same when such components are physically disconnected. In this connection, nipple 54 is fixedly secured to valve 53, but its end which communicates with valve 52 removably seats within such valve at its fluid outlet. Valve 53 is connected to the actuating rod 58 of a pneumatic cylinder 59 providing the line disconnect actuator.

A track for guiding movement of valve 53 is provided by a pair of opposed plates 61 encompassing opposite sides of such valve and having their free ends secured to corresponding opposite sides of valve 52. Although not shown, it will be appreciated that the casing of valve 53 and the opposed plates 61 have cooperable guide structure, such as mating grooves and runners, to guide movement of valve 53 between the positions shown in FIGS. 4a and 4b. As can be seen, this movement is in the direction in which fluid normally flows between valve 52 and nipple 54. Specifically, the parts of such components normally in fluid communication are physically separated axially from one another.

It will be seen from the above that the component disconnecting mechanism of the invention provides the effective isolation of the milk collection tank 14 from the teat cup cluster necessary to permit such teat cup cluster to be cleansed with substances which must be prevented from reaching the tank. When the components are in the disconnected state illustrated in FIG. 4b, any substance which may inadvertently enter the milk inlet 56 of valve 52 and pass therethrough will be shunted to the exterior of the milk line, rather than flow into the nipple 54 and enter the remainder of the milk line.

Means are provided to pass cleansing fluid through the cluster 11 once the milking cycle is completed and the milk flow path represented by the arrows 13 is interrupted by separation of nipple 54 from valve 52. It should be noted that valve 52 is closed during the cleansing cycle. The means for passing cleansing fluid through the cluster is enclosed in the schematic showing of FIG. 1 in the dotted line enclosure 62 and basically comprises a valving arrangement for controlling the application of water, sanitizing fluid and vacuum to the teat cup cluster. It also includes a fluid safety valve 63 connected between the supply of cleansing fluids and the milk flow path 13. Valve 63 is maintained closed during the milking operation and acts to isolate the cleansing fluid system from the milk flow line.

All of the vacuum and liquid valves in the system are preferably pneumatically operated piston valves. As will be discussed in more detail hereinafter, a pneumatic control circuit is provided to operate the same at the proper times and in the proper sequence.

The cleansing fluid system includes a parallel connection of a clear water valve 64, a sanitizing fluid valve 66, another clear water valve 67 and a check drain valve 68. During the cleansing cycle, safety valve 63 is opened and the valves 64–67 opened and closed sequentially to pass fluid from the source to which each is respectively connected, through the teat cup cluster 11. That is, the valve 64 is first opened to pass clear water through the teat cup cluster to flush therefrom all milk residue remaining after the end of the milking cycle. Once it is so flushed and valve 64 is again closed, valve 66 is opened to pass a sanitizing liquid through the teat cup cluster, which sanitizing liquid is preferably one selected to kill any bacteria or other infectious material which it is apt to encounter in the teat cup cluster. In this connection, it has been found that the liquid sold with the designation "Rapidyne" by West Agro Chemical Inc., Los Angeles, Calif., is quite suitable for this purpose.

After the sanitizing liquid is introduced into the teat cup cluster, valve 66 is closed and a suitable delay is provided to assure that the liquid will be in contact with the surfaces of the teat cup cluster a sufficiently long period of time, e.g., 60 seconds, to kill whatever bacteria there might be. After the delay time, valve 67 is opened for a period of time to flush the teat cup cluster and the remainder of the system of the sanitizing liquid with clean water. In this connection, check valve 68 is opened to permit outward liquid flow to prevent liquid accumulation in the cleansing valve system.

After the cluster 11 and the remainder of the system is flushed with water, vacuum valves 69 and 70 are opened to apply a vacuum to the teat cup cluster and all portions of the milk circuit forwardly of isolation valve 52, and to the cleansing system 62. In this connection, check valve 68 will close in response to the vacuum pressure so as not to act as a vacuum leak. Vacuum source 16 will then draw any residue cleansing fluid into a holding tank 71, effectively drying the teat cup cluster and milk circuit to prevent dilution of the milk which later flows therethrough. After closure of vacuum valves 69 and 70, the fluid safety valve 63 is then closed to again isolate the cleansing system 62 from the milk circuit, and nipple 54 is reconnected with valve 52 to place the milk circuit in appropriate condition for milking of another cow.

Figure 5:
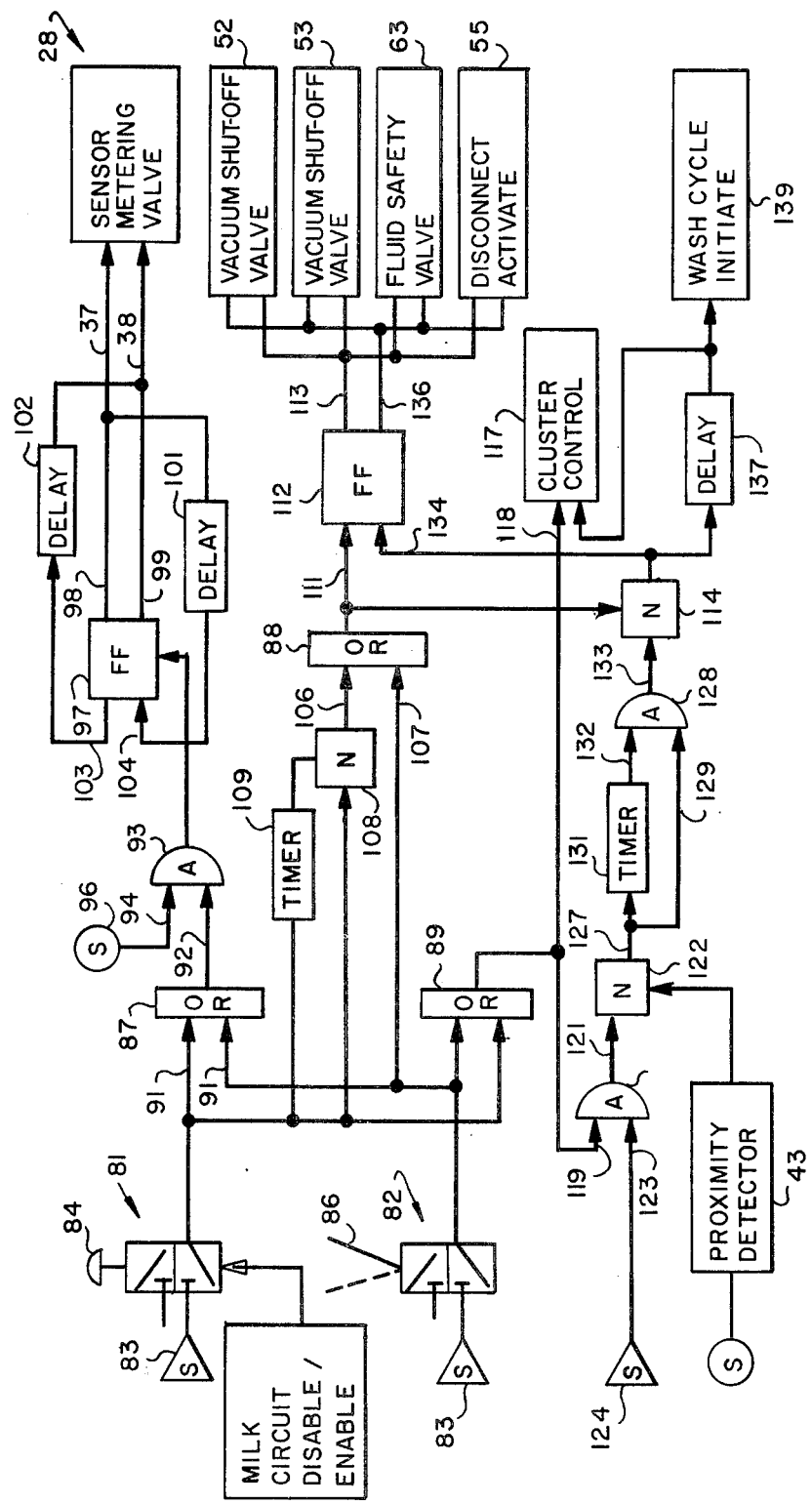
FIG. 5 is a schematic flow diagram of a pneumatic control arrangement for controlling operation of milk flow from a teat cup cluster and initiating the method and apparatus of the invention for internally cleansing such cluster between the milking of successive cows.
Figure 6:
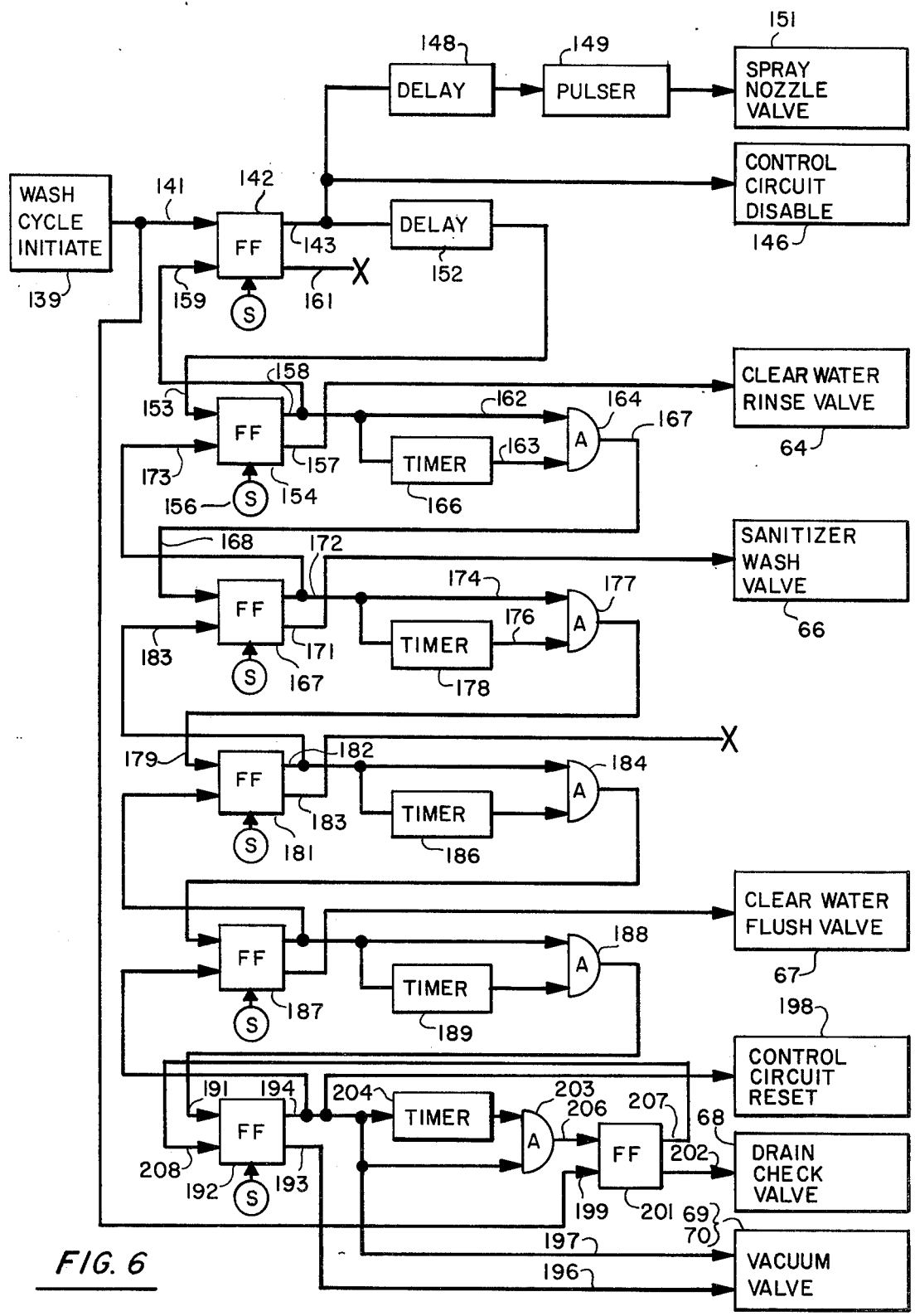
FIG. 6 is a schematic flow diagram of a pneumatic control circuit for operating components of the invention associated with the teat cup cleansing operation.

As mentioned previously, operation of the various components of the cleansing arrangement is most desirably controlled by a pneumatic control circuit. FIGS. 5 and 6 illustrate such a circuit and diagrammatically indicates the manner in which it is connected to the various mechanical components.

The control circuit is designed to enable the cow milking and cluster cleansing operations to be either automatically or manually controlled. To this end, both a palm actuator switch 81 for automatic operation and a manual override switch 82 for manual operation are included. Both of such switches are connected to a primary air source represented at 83. Automatic switch 81 includes a plunger 84 which when depressed initiates the milking and cleansing cycle., whereas override switch 82 includes a toggle actuator 86 which is movable between an "OFF" position shown in solid lines and an automatic override "ON" position shown in dotted lines.

The switches 81 and 82 are connected into the remainder of the pneumatic circuitry via OR gates 87, 88 and 89. OR gate 87 is the entry component of the control logic that controls operation of the metering device piston, OR gate 88 is the entry component of the logic which controls the operation of the disconnect actuator and those valves which must be actuated prior to the cleansing cycle, and OR gate 89 is the entry component for the logic which initiates the cleansing cycle as well as controls a mechanism for withdrawing the teat cup cluster away from a cow being milked at the end of the milking cycle.

Control of the reciprocal piston within the metering device 28 will first be described. Its operation is initiated by actuation either of the automatic switch 81 or the manual switch 82. More particularly, actuation of either of such switches will apply air pressure to one of the two input ports 91 of OR gate 87, with the result that pressure will appear at the output of such OR gate. The OR gate output is connected to one of the input ports 92 of an AND gate 93, the other input port 94 of which is connected to a pressure source 96. The output port of AND gate 93 is connected to a FLIP-FLOP 97 to both arm and supply pressure to the same upon presentation of pressure at the output port of AND gate 93.

As illustrated, FLIP-FLOP 97 is connected in a feedback arrangement to supply pressure alternately to its output ports 98 and 99, which output ports are connected to the previously described inlets 37 and 38 of metering device 28. That is, DELAYS 101 and 102 are respectively connected between the output ports 98 and 99 of the FLIP-FLOP 97 and corresponding inlet ports 103 and 104 thereof. Upon pressure appearing at output port 98, for example, of the FLIP-FLOP, the opposite inlet port 104 of such FLIP-FLOP 97 will be energized after a period of time determined by DELAY 101. This will result in air pressure being transferred from output port 98 to port 99. Such pressure will likewise result in the application of pressure to the inlet 103 of the FLIP-FLOP, after a period of time determined by DELAY 102. Upon such application of pressure, the output pressure will again be directed to output port 98. This alternation of pressure between ports 98 and 99 and, hence, between metering device inlets 37 and 38, will continue until such time as either the switch 81 is disabled, as will be discussed, or the switch 82 is turned to an "OFF" position. It should be noted that the frequency with which the piston of the metering valve is oscillated can be easily adjusted merely by adjusting the time delays determined by DELAYS 101 and 102.

Depression of the plunger 84 or movement of the toggle 86 also completes communication of the teat cup cluster 11 with the milk collection tank 14 and isolates the cleansing system 62 from the milk circuit. More particularly, actuation of either of the switches 81 or 82 will also result in air pressure being applied immediately to one of the two respective input ports 106 and 107 of OR gate 88. Means are provided to assure that when the control circuit is under automatic operation, pressure is applied to the input gate 106 of OR gate 88 for a specified period of time. That is, pressure from switch 81 is applied to the input gate 106 through a NOT 108 which normally permits passage of pressure therethrough.

The inhibit inlet of NOT 108 is connected through a TIMER 109 to automatic switch 81. The delay provided by TIMER 109 is initiated, therefore, at the same time pressure begins to flow through NOT 108. When TIMER 109 times out, i.e., when it does pass pressure to NOT 108, the NOT 108 will inhibit the passage of pressure to OR gate input 106. The purpose of the delay provided by this arrangement is to ensure that when the milking machine is under automatic operation, the machine will stay "ON" for a period of time, e.g., three minutes, in spite of lack of milk in the chamber 19 of the milk flow sensor. This delay will provide the time required by the operator to apply the teat cup cluster to a cow to be milked and to allow milk then to fill chamber 19. In this connection, many cows do not immediately "let down" their milk so that there is often a delay between the time one initiates milking a cow and significant milk flow.

Most desirably, TIMER 109 is adjustable to permit the operator to select the desired time delay. The timer can include a timing chamber and adjustable timer component Part No. 59115 available from Aro Corporation, Bryan, Ohio.

Upon the introduction of pressure at either inlet port 106 or inlet port 107 of OR gate 88, pressure will appear on its outlet port which is connected to one input port 111 of a FLIP-FLOP 112. FLIP-FLOP 112 will respond thereto by passing pressure to its outlet port 113. Such outlet port is connected to several of the mechanical components of the invention. That is, it is connected to both of the vacuum isolation valves 52 and 53, to the fluid safety valve 63, and to the disconnect actuator 55. It is connected to those air inlet nipples of the vacuum isolation valves which respond to pressure by opening such valves. On the other hand, it is connected to the fluid safety valve 63 so as to close the same to isolate the cleansing system from the milk circuit, and to the disconnect actuator 55 to assure that actuating rod 58 is extended to complete the connection between the valves 52 and 53. Because of the timing and NOT arrangement previously described at the inlet 106 of OR gate 88, the vacuum isolation valves will be maintained open, the fluid safety valve maintained closed, and the milk circuit connection maintained complete for a specified period of time. During the presence of pressure on output port 111 of OR gate 88, pressure will also be applied to the sensing input of NOT 114 to prevent it from passing pressure during such time which might be applied thereto as discussed below.

Actuation of either of the switches 81 and 82 will also cause pressure to appear immediately at the outlet of OR gate 89. As illustrated, such outlet is connected to both an AND gate 116 and directly to a cluster control 117. Cluster control 117 represents a conventional, pneumatically operated mechanical linkage for withdrawing the milk cup cluster from beneath a cow after the cow has been milked. The presence of pressure from OR gate 89 on its input port 118 will assure that the linkage of such cluster control is extendable to position the teat cup cluster beneath the cow.

The application of pressure from OR gate 89 to the input port 119 of AND gate 116 will cause such AND gate to apply pressure to input port 121 of NOT 122. In this connection, AND gate input port 123 is connected to a continuous pressure source represented by 124. Pressure flow through NOT 122 is controlled by a sensing input thereof connected to the proximity sensor 43 of the previously described milk flow sensor.

During the milking operation, i.e., before the previously described proximity sensor 43 is activated, such sensor allows pressure from a regulated source 126 to be applied to NOT 122 to inhibit passage therethrough of pressure on input port 121 from AND gate 116. However, upon proximity sensor 43 indicating that the cow being milked has given all of her milk, i.e., upon the exhaustion of all milk within chamber 19, pressure from the proximity sensor 43 will be terminated with the result that NOT 122 can pass pressure from its input port 121 to its output port 127.

As illustrated, output port 127 of NOT 122 is connected through both TIMER 131 and AND gate 128 to the input ports of NOT 114. That is, pressure on NOT output 127 is applied directly to one input port 129 of AND gate 128, whereas it is applied through a TIMER 131 to the other input port 132 thereof. AND gate 128 will react to passage by TIMER 131 of pressure to input port 132 thereof by passing pressure to its output port, which pressure will be introduced to a pressure passing input port 133 of NOT 114.

Assuming NOT 114 is not inhibited at this time for passage of such pressure, by the presence of pressure at the output of OR 88, NOT 114 will react to such pressure at its input port 133 by applying pressure to its output port and, hence, to the input port 134 of FLIP-FLOP 112. Such pressure will transfer the output pressure of such FLIP-FLOP from the output port 113 to its output port 136. As illustrated, output port 136 is also connected to the vacuum isolation valves 52 and 53, the fluid safety valve 63 the disconnect actuator 55. However, it is so connected that upon pressure appearing on the same as described, the isolation valves will be closed, the fluid safety valve 63 will be opened, and the disconnect actuator 55 will be correspondingly opened, to ready the arrangement for the teat cup cluster cleansing cycle.

Output pressure on NOT 114 will also be applied to the cluster control 117 through a DELAY 137 in order to retract such cluster control. The purpose of the DELAY 137 is to assure that the vacuum which otherwise maintains the teat cup clusters on the cow's udder is released by closing of the valve 53 prior to the mechanical linkage 117 withdrawing the cluster.

The output of NOT 114 also passes to pneumatic circuitry for controlling liquid supply valves of the cluster cleansing arrangement. This passage of the pressure to the liquid cleansing valves is represented in FIG. 5 by the "Wash Cycle Initiate" box 139.

As one important feature of the instant invention, upon initiation of the cleansing cycle the automatic start switch 81 is disabled so that there is no chance the switch can be inadvertently actuated during the cleansing cycle and reconnect the teat cup cluster to the milk collection tank. More particularly, as shown in FIG. 6, pressure appearing at the output port of DELAY 137 is applied to an input port 141 of a FLIP-FLOP 142. FLIP-FLOP 142 will respond thereto by passing pressure to its output port 143. At the appearance of pressure at such output port, switch 81 will be disabled as is represented by flow line 144 extending to a "Control Circuit Disable" box 146. In this connection, it should be noted that a Control Circuit Disable/Reset box 147 is shown connected into switch 81 (FIG. 5) to complete the circuit. It should further be noted that when the apparatus is under manual control, the cleansing cycle is initiated by returning the toggle switch 86 to the "OFF" position and then depressing palm button 84 of the automatic switch 81. Thus, control is returned to the automatic arrangement so that the cleansing cycle is automatically controlled and the milking control circuit is disabled.

Appearance of pressure on output port 143 will also result in the udder of the cow which has just been milked being sprayed with a disinfectant. More particularly, such pressure will be applied through a DELAY 148 to a PULSER 149 controlling a spray nozzle valve 151. The spray nozzle 151 and valve therefor can be, for example, the arrangement manufactured and sold for such purpose by Monarch Manufacturing Works, Inc., Philadelphia, Pa. Valve 151 is selected to be one normally maintained closed by pneumatic pressure. Thus, upon PULSER 149 relieving the air pressure on the valve, the spray nozzle will emit a disinfectant. The purpose of DELAY 148 is to provide sufficient time to enable the cluster control 117 to withdraw the milk teat cup cluster before the udder is sprayed.

Pressure on output port 143 results in sequential operation of the liquid supply valves 64–67. More particularly, such pressure is passed through a DELAY 152 to an input port 153 of a FLIP-FLOP 154. FLIP-FLOP 154 will respond to the appearance of pressure on its input port 153 by transferring fluid pressure provided by a source 156, from its output port 157 to its output port 158. The result will be that the clear water rinse valve 64 will be opened. In this connection, rinse valve 64, like all of the liquid valves, is designed to be maintained closed by air pressure but once such air pressure is released will be opened by the pressure of liquid from its associated supply to permit liquid flow.

The appearance of pressure at output 158 of the FLIP-FLOP 154 will terminate pressure at the output 143 of FLIP-FLOP 142; and initiate timing of water flow through valve 64, as well as the opening of the sanitizing liquid valve 66. That is, pressure at output 158 is applied to input port 159 of FLIP-FLOP 142 to transfer its output pressure to its closed output port 161. Such pressure at output 158 of FLIP-FLOP 154 is also applied to two input ports 162 and 163 of an AND gate 164. While such pressure is applied directly to the input port 162 of the AND gate, it must pass through a TIMER 166 prior to its application to the input 163. TIMER 166, which may also include an accumulation chamber, is selected to provide a desired delay between the opening and closing of valve 64. Upon TIMER 166 passing pressure to input port 163 of AND 164, AND 164 will pass pressure to its outlet port 167. As illustrated, such output port is connected to input port 168 of the next FLIP-FLOP 169. The result will be that the outlet pressure of FLIP-FLOP 169 will be redirected from its output port 171 to its output port 172. This will result in the application of pressure to the input port 173 of FLIP-FLOP 154 to cause the FLIP-FLOP to redirect the pressure from source 156 from its output 158 to its output 157, thereby closing rinse valve 64.

Sanitizing liquid valve 66 will be opened simultaneously with the closing of valve 64. Operation of such valve is controlled similarly to control of operation of clear water rinse valve 64. That is, the output 172 of FLIP-FLOP 169 is also connected to the inputs 174 and 176 of an AND gate 177. Thus, the application of pressure at output port 172 will start a timing function through AND gate 177 and a TIMER 178, determining the length of time valve 66 is open. Upon such time passing, pressure will be applied by the AND gate 177 to the input 179 of a FLIP-FLOP 181. This will result in the output pressure of such FLIP-FLOP being transferred to its output port 182, which output port is connected to the input port 183 of FLIP-FLOP 169. FLIP-FLOP 169 will react thereto by returning its output pressure from output port 172 to output port 171 to close sanitizing liquid valve 66.

Simultaneously with the closing of sanitizing valve 66, a delay period is initiated to permit the sanitizing fluid to remain in the teat cup cluster a sufficiently long period of time to kill any bacteria it should contact. That is, the output port 183 from which the output of FLIP-FLOP 181 is transferred to its output port 182, is blocked off, rather than directed to an active element. However, the transference of such output pressure to port 182 will initiate a timing function which sets the delay period between the closing of sanitizing valve 66 and the opening of flush valve 67. This time delay is provided by an AND gate 184 and a TIMER 186 in the same manner as the time delay provided between the opening of the valves 64 and 66.

The appearance of pressure at the output of AND 184 will direct a FLIP-FLOP 187 to cause FLIP-FLOP 179 to discontinue the application of pressure to the delay mechanism. It will also direct FLIP-FLOP 187 to open flush valve 67. After a time delay determined by the combination of AND gate 188 and TIMER 189, flush valve 67 will be closed by the application of pressure to the input port 191 of a FLIP-FLOP 192 to change its output pressure from output port 193 to 194.

The application of pressure to the output port 194 of FLIP-FLOP 192 will also open the vacuum valves 69 and 70 to provide drying of the teat cup cluster and that portion of the milk circuit which has had liquid introduced therein. That is, the vacuum valves 69 and 70 are normally maintained in a closed position by the presence of pressure at the input of their control valves represented at 196, which input is connected to the output port 193 of FLIP-FLOP 192. The ports for controlling the opening of such vacuum valves, as is represented at 197 in the drawing, are connected to the output port 194 of the FLIP-FLOP 192 to thereby open such valves when the output pressure of such FLIP-FLOP is transferred to output port 194.

The presence of pressure at output port 194 of FLIP-FLOP 192 will also reset the automatic switch 81 to permit the milking operation to again be started. This is represented by the connection to the output of such FLIP-FLOP, of a "Control Circuit Reset" box 198.

Drain check valve 68 is normally maintained in an open position by, for example, its closure flapper normally being urged to an open position by a compression spring. However, upon the beginning of the cleansing cycle, its flapper is closed against the urging of such spring by the application of pneumatic pressure to its controls. That is, an input port 199 of a FLIP-FLOP 201 which controls such valve is connected directly to the output of the Wash Cycle Initiate box 139 (the output of DELAY 137 in FIG. 5). This will result in the application of pneumatic pressure at the output port 202 of such FLIP-FLOP, which output port is connected to the control of the drain check valve 68.

Check valve 68 is allowed to open again at the same time vacuum valves 69 and 70 are closed to terminate the drying operation. More particularly, the appearance of pressure at output port 194 of FLIP-FLOP 192 will initiate a delay period determined by an AND gate 203 and a TIMER 204. After such delay period selected to provide vacuum drying, the output of the AND gate 203 is applied to the input 206 of FLIP-FLOP 201. This results in the output pressure of such FLIP-FLOP being transferred to its output port 207, which output port is connected, as is illustrated, to the input port 208 of FLIP-FLOP 192. This will return the output pressure of such FLIP-FLOP from its output port 194 to its output port 193 and, hence, close the vacuum valves 69 and 70 and relieve the pressure on FLIP-FLOP output 202 connected to the control of the drain check valve 68.

The above operation completes the cleansing cycle. In this connection, it should be noted that the return of the output pressure of FLIP-FLOP 192 from its output port 194 to its output port 193 will not cause the milk control circuit to be again disabled. That is, once such circuit is reset it will continue to remain operable until such time as it is again disabled when the cleansing cycle is initiated as discussed previously.

It will be recognized from the above that a relatively simple and yet reliable means is provided to enable a teat cup cluster to be automatically cleansed between the milking of successive cows without concern that the milk will be contaminated. Although the invention has been described in connection with a preferred embodiment thereof, many changes and modifications can be made without departing from its spirit. For example, the metering valve can be used in other parts of a milk circuit of an automatic milking machine in addition to, or instead of, being used as part of a milk flow sensor. It is therefore intended that the coverage afforded applicants be determined only by the spirit of the invention as defined by the claims and their equivalent language.

We claim:

1. In automatic apparatus for successively milking a plurality of cows with a cow milking teat cup cluster and for internally cleansing the teat cup cluster between the milking of successive cows therewith, comprising the combination of:

means normally communicating said teat cup cluster with a milk receptacle for the flow of milk therebetween;

means to control milking a cow with said teat cup cluster;

means to prevent operation of said means to control milking a cow, during internal cleansing of said teat cup cluster;

means to interrupt fluid communication of said cluster with said milk receptacle, during internal cleansing of said cup cluster;

means to pass cleansing fluid through said cluster; and means to control operation of said fluid communication interrupting means and said cleansing fluid passing means, which control means directs said cleansing fluid passing means to pass said cleansing fluid through said cluster only when fluid communication of said cluster with said milk receptacle is interrupted;

said means to interrupt said fluid communication of said cluster with said milk receptacle including means both to disconnect fluid communication between and to physically separate and space away from one another in a direction having a directional component extending along the path of normal fluid communication therebetween, the fluid communicating parts of a pair of adjacent flow components providing a continuous flow path therebetween for milk.

2. Apparatus according to claim 1 for internally cleansing a cow milking teat cup cluster wherein said parts are moved axially away from one another to provide said physical separation.

3. Apparatus according to claim 2 wherein said pair of adjacent flow components are a valve and a fluid pipe.

4. A method of internally cleansing a cow milking teat cup cluster between the milking of successive cows therewith wherein said cluster is normally in fluid communication with a milk receptacle and means are included for controlling the application of vacuum to draw milk from said cup cluster into said milk receptacle, comprising the steps of:

detecting discontinuance for more than a predetermined time of flow of milk from said cluster to said milk receptacle during the milking of a cow;

disabling said milk drawing means in response to such a discontinuance of milk flow;

interrupting said fluid communication of said cluster with said milk receptacle;

thereafter passing sanitizing fluid through said cluster to kill any bacteria therein;

thereafter providing a delay so that said sanitizing fluid remains in contact with the internal surfaces of said cluster a period of time to sanitize the same;

passing rinsing fluid through said cluster to flush said sanitizing fluid therefrom;

thereafter causing gaseous flow through said cluster to remove residual rinsing or sanitizing fluid therefrom; and reestablishing said fluid communication of said cluster with said milk receptacle.

5. A method according to claim 4 wherein said step of interrupting said fluid communication of said cluster with said milk receptacle includes physically separating a pair of adjacent flow components normally providing a continuous flow path therebetween for milk.

6. A method according to claim 4 of internally cleansing a cow milking teat cup cluster wherein said step of causing gaseous flow through said cluster includes:

applying a vacuum to said cluster to draw any residual rinsing or sanitizing fluid therefrom prior to reestablishment of said fluid communication with said receptacle.

7. A method according to claim 4 of internally cleansing a cow milking teat cup cluster further including the step of passing rinsing fluid through said cluster to flush residual milk therefrom, prior to the step of passing sanitizing fluid through said cluster to kill any bacteria therein but after said step of interrupting fluid communication of said cluster with said milk receptacle.

* * * * *